United States Patent
Ohta et al.

[11] Patent Number: 4,987,197
[45] Date of Patent: Jan. 22, 1991

[54] POLYIMIDE/POLYAMIDEIMIDE RESIN COMPOSITION

[75] Inventors: Masahiro Ohta, Yokohama; Saburo Kawashima, Yokosuka; Katsuaki Iiyama, Odawara; Shoji Tamai; Hideaki Oikawa, both of Yokohama; Akihiro Yamaguchi, Kamakura, all of Japan

[73] Assignee: Mitsui Toatsu Chemicals, Inc., Tokyo, Japan

[21] Appl. No.: 341,810

[22] Filed: Apr. 24, 1989

[30] Foreign Application Priority Data

May 6, 1988 [JP] Japan .................................. 63-109082
May 9, 1988 [JP] Japan .................................. 63-110406

[51] Int. Cl.$^5$ .............................................. C08L 79/08
[52] U.S. Cl. ..................... 525/436; 525/432;
528/125; 528/171; 528/173; 528/183; 528/189;
528/350; 528/352; 528/353
[58] Field of Search ............... 528/125, 353, 188, 183,
528/189, 171, 173, 350, 352; 525/436, 432

[56] References Cited

U.S. PATENT DOCUMENTS 4,214,071 7/1980 Alvino et al. ................. 528/188
4,861,855 8/1989 Bockrath et al. ................. 525/436

Primary Examiner—Harold D. Anderson
Attorney, Agent, or Firm—Burns, Doane, Swecker & Mathis

[57] ABSTRACT

This invention relates to molding resin compositions, and more particularly relates to polyimide resin compositions having markedly improved molding ability in addition to excellent high temperature stability, chemical resistance and mechanical strength.

The polyimide resin compositions of this invention comprises 99.9 to 50.0% by weight of the polyimide and 0.1 to 50.0% by weight of aromatic polyamideimide. The polyimide consists essentially of recurring units of the following formula:

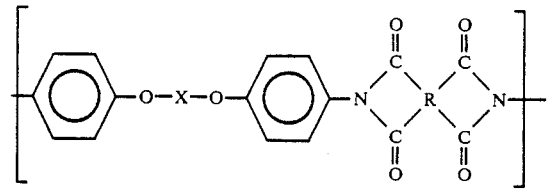

wherein X is

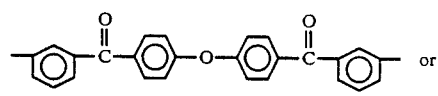 or

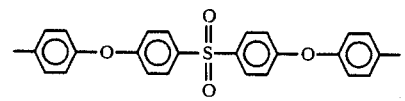

and R is, for example,

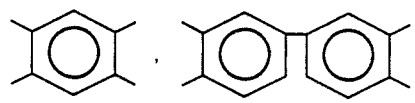

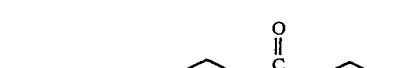

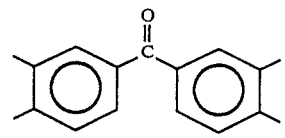

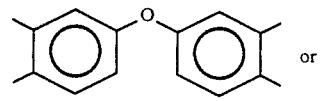 or

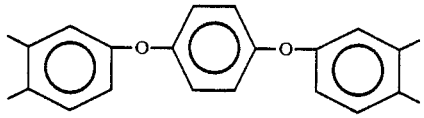

12 Claims, No Drawings

POLYIMIDE/POLYAMIDEIMIDE RESIN COMPOSITION

BACKGROUND OF THE INVENTION

The present invention relates to a molding resin composition, and more particularly relates to a molding resin composition of polyimide which is excellent in high-temperature stability, chemical resistance and mechanical strength as well as processing ability in molding.

Polyimide has so far been excellent in mechanical strength, dimensional stability, high-temperature stability, flame retardance and electrical insulative properties. Therefore polyimide has been used in the field of electric and electronic parts, aeronautics and space instruments and transport machinery. It is also expected that it will be used in the future in fields where high-temperature resistance is required.

A variety of polyimides which exhibit outstanding properties have been developed. Some polyimides, however, have no distinct glass transition temperature, although they are excellent in high-temperature stability. As a result, when employed as molding materials, specific methods such as sinter molding must be used for processing. Other polyimides which are excellent in processability have low glass transition temperatures and are soluble in halogenated hydrocarbons, which renders these polyimides unsatisfactory for use in applications which require high-temperature stability and solvent resistance. Thus, these polyimides have numerous advantages and disadvantages. Accordingly a polyimide has been desired which is excellent in high-temperature stability and solvent resistance and also has an outstanding processing ability as a molding material. The present inventors have found a polyimide which satisfies the aforementioned properties. The polyimide has recurring units of the formula:

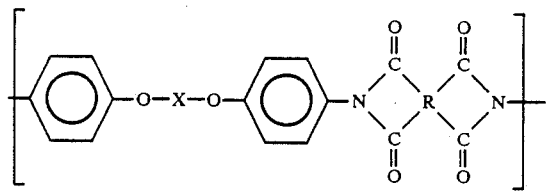

wherein X is a divalent radical selected from the group consisting of a radical having the formula:

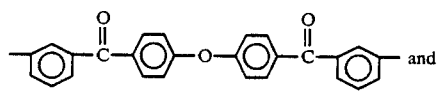

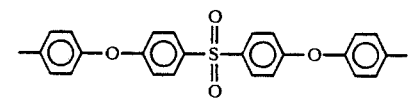

and R is a tetravalent radical selected from the group consisting of an aliphatic radical having 2 or more carbon atoms, alicyclic radical, monoaromatic radical, fused polycyclic radical, and polycyclic aromatic radical where aromatic radicals are linked to one another directly or via a bridge member.

This polyimide is disclosed by Mitsui Toatsu Chemicals, Inc. in Japanese Laid-Open Patent Nos. TOKKAI-SHO 63-243132 (1988), 64-9226 (1988) and 64-9227 (1989).

The above polyimide is a thermoplastic polyimide having fluidity at high temperatures in addition to excellent mechanical, thermal and electrical properties.

However, polyimide resin compositions are desired to provide further improved high-temperature stability and mechanical strength in addition to the essential and excellent characteristics of the polyimide.

SUMMARY OF THE INVENTION

The object of this invention is to provide a polyimide resin composition having further improved high-temperature stability and mechanical strength without impairing the essential characteristics of the polyimide such as mechanical, thermal and electrical properties and solvent resistance.

DETAILED DESCRIPTION OF THE INVENTION

The present inventors have found that a polyimide composition consisting essentially of a novel polyimide and a specific amount of an aromatic polyamideimide is particularly effective for the above object.

The present invention relates to a polyimide resin composition comprised of 99.9 to 50.0% by weight of polyimide which consists essentially of recurring units of the formula:

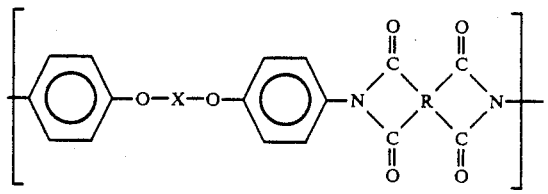

wherein X is a divalent radical selected from the group consisting of a radical having the formula:

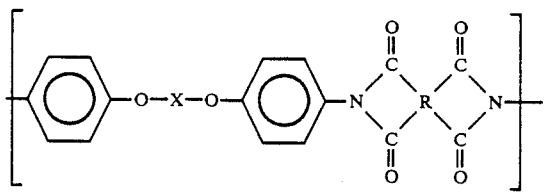

and R is a tetravalent radical selected from the group consisting of an aliphatic radical having 2 or more carbon atoms, alicyclic radical, monoaromatic radical, fused polycyclic radical, and polycyclic aromatic radical where aromatic radicals are linked to one another directly or via a bridge member, and 0.1 to 50.0% by weight of a aromatic polyamideimide.

The polyimide used in this invention is derived from a diamine of the following formula:

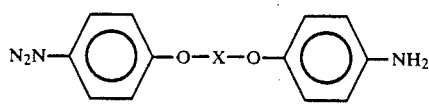

where X is the same as above.

The diamine may be bis[4-(3-(4-aminophenoxy)benzoyl)phenyl]ether or bis[4-(4-(4-aminophenoxy)phenoxy)phenyl]sulfone which have the following formulae respectively:

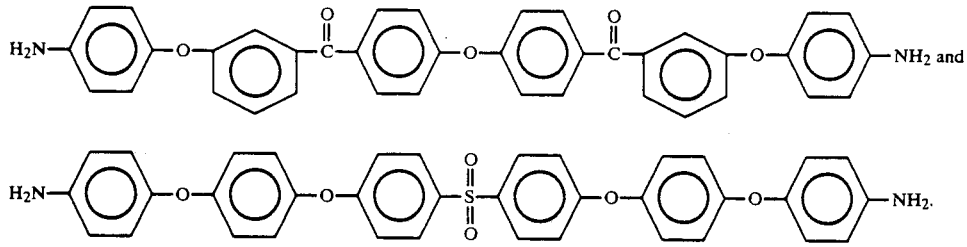

The diamine is reacted with at least one tetracarboxylic dianhydride in an organic solvent to yield polyamic acid. The polyamic acid is imidized to obtain polyimide.

The tetracarboxylic dianhydride used in the above reaction is an anhydride of the formula:

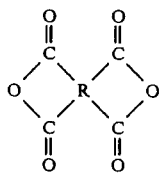

where R is the same as above.

The tetracarboxylic dianhydride includes, for example,
ethylenetetracarboxylic dianhydride,
butanetetracarboxylic dianhydride,
cyclopentanetetracarboxylic dianhydride,
pyromellitic dianhydride,
3,3',4,4'-benzophenonetetracarboxylic dianhydride,
2,2',3,3'-benzophenonetetracarboxylic dianhydride,
3,3',4,4'-biphenyltetracarboxylic dianhydride,
2,2',3,3'-biphenyltetracarboxylic dianhydride,
2,2-bis(3,4-dicarboxyphenyl)propane dianhydride,
2,2-bis(2,3-dicarboxyphenyl)propane dianhydride,
bis(3,4-dicarboxyphenyl) ether dianhydride,
bis(2,3-dicarboxyphenyl) ether dianhydride,
bis(3,4-dicarboxyphenyl) sulfone dianhydride,
1,1-bis(2,3-dicarboxyphenyl)ethane dianhydride,
bis(2,3-dicarboxyphenyl)methane dianhydride,
bis(3,4-dicarboxyphenyl)methane dianhydride,
4,4'-(p-phenylenedioxy)diphthalic dianhydride,
4,4'-(m-phenylenedioxy)diphthalic dianhydride,
2,3,6,7-naphthalenetetracarboxylic dianhydride,
1,4,5,8-naphthalenetetracarboxylic dianhydride,
1,2,5,6-naphthalenetetracarboxylic dianhydride,
1,2,3,4-benzenetetracarboxylic dianhydride,
3,4,9,10-perylenetetracarboxylic dianhydride,
2,3,6,7-anthracenetetracarboxylic dianhydride and
1,2,7,8-phenanthrenetetracarboxylic dianhydride.

Particularly preferred tetracarboxylic dianhydrides are pyromellitic dianhydride, 3,3',4,4'-biphenyltetracarboxylic dianhydride, 3,3',4,4'-benzophenonetetracarboxylic dianhydride, bis(3,4-dicarboxyphenyl) ether dianhydride and 4,4'-(p-phenylenedioxy)diphthalic dianhydride.

The tetracarboxylic dianhydride can be used singly or in mixtures of two or more.

The polyimide which is used in the composition of this invention is prepared by using the above stated diamine as a raw material. In order to obtain the composition of this invention, other diamines can also be used in combination with the diamine within the range which has no adverse affect on the advantageous properties of the polyimide.

Examples of diamines which may be used in admixture with the diamine include, m-phenylenediamine, o-phenylenediamine, p-phenylenediamine, m-aminobenzylamine, p-aminobenzylamine, bis(3-aminophenyl) ether, (3-aminophenyl) (4-aminophenyl) ether, bis(4-aminophenyl) ether, bis(3-aminophenyl) sulfide, (3-aminophenyl) (4-aminophenyl) sulfide, bis(4-aminophenyl) sulfide, bis(3-aminophenyl) sulfoxide, (3-aminophenyl) (4-aminophenyl) sulfoxide, bis(4-aminophenyl) sulfoxide, bis(3-aminophenyl) sulfone, (3-aminophenyl) (4-aminophenyl) sulfone, bis(4-aminophenyl) sulfone, 3,3'-diaminobenzophenone, 3,4'-diaminobenzophenone, 4,4'-diaminobenzophenone, bis[4-(3-aminophenoxy)phenyl]methane, bis[4-(4-aminophenoxy)phenyl]methane, 1,1-bis[4-(3-aminophenoxy)phenyl]ethane, 1,1-bis[4-(4-aminophenoxy)phenyl]ethane, 1,2-bis[4-(3-aminophenoxy)phenyl]ethane, 1,2-bis[4-(4-aminophenoxy)phenyl]ethane, 2,2-bis[4-(3-aminophenoxy)phenyl]propane, 2,2-bis[4-(4-aminophenoxy)phenyl]propane, 2,2-bis[4-(3-aminophenoxy)phenyl]butane, 2,2-bis[4-(4-aminophenoxy)phenyl]butane, 2,2-bis[4-(3-aminophenoxy)phenyl]-1,1,1,3,3,3-hexafluoropropane, 2,2-bis[4-(4-aminophenoxy)phenyl]-1,1,1,3,3,3-hexafluoropropane, 1,3-bis(3-aminophenoxy)benzene, 1,3-bis(4-aminophenoxy)benzene, 1,4-bis(3-aminophenoxy)benzene, 1,4-bis(4-aminophenoxy)benzene, 4,4'-bis(3-aminophenoxy)biphenyl, 4,4'-bis(4-aminophenoxy)biphenyl, bis[4-(3-aminophenoxy)phenyl]ketone, bis[4-(4-aminophenoxy)phenyl]ketone, bis[4-(3-aminophenoxy)phenyl]sulfide, bis[4-(4-aminophenoxy)phenyl]sulfide, bis[4-(3-aminophenoxy)phenyl]sulfoxide, bis[4-(4-aminophenoxy)phenyl]sulfoxide, bis[4-(3-aminophenoxy)phenyl]sulfone, bis[4-(4-aminophenoxy)phenyl]sulfone, bis[4-(3-aminophenoxy)phenyl]ether and bis[4-(4-aminophenoxy)phenyl]ether.

The aromatic polyamideimide is a polymer having both amide and imide linkages and is substantially composed of recurring units of the following formula:

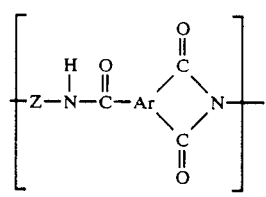

wherein Ar is a trivalent aromatic radical having one or more benzene rings, and Z is a divalent Organic radical.

The aromatic polyamideimide is described in detail in Modern Plastics Encyclopedia, page 37 to 38 (1986–1987).

The particularly preferred aromatic polyamideimide of this invention has the recurring units represented by the formula:

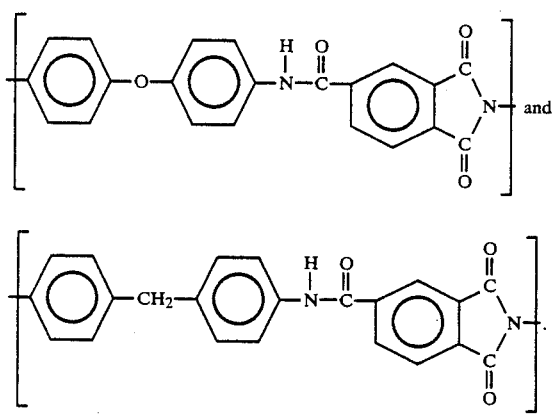

The aromatic polyamideimides are commercially available under the trade mark, for example, TORLON from Amoco Chemicals Corp. in USA Or TI-1000 and TI-5000 SERIES of aromatic polyamideimide from TORAY INDUSTRIES in Japan.

The molding composition of this invention is prepared so as to comprise the above mentioned polyimide in the range of 99.9 to 50.0% by weight and aromatic polyamideimide in the range of 0.1 to 50.0% by weight with the total sum being 100% by weight.

The enhancing effect of the aromatic polyamideimide on the high temperature stability and/or mechanical strengths can be found even in a small amount in the polyimide/aromatic polyamideimide composite resin of this invention. The lower limit of the amount in the composition is 0.1% by weight. The preferred amount is not less than 0.5% by weight.

The aromatic polyamideimide has an extremely high melt viscosity compared with other thermoplastic resins, and hence too much of the aromatic polyamideimide in the composition can adversely affect the excellent processing ability of the polyimide and unfavorably decrease the elongation at break. Thus, the amount of aromatic polyamideimide in the composition has an upper limit and is preferably 50% by weight or less.

In the preparation of the composition of this invention, known methods can be employed and, for example, the below described methods are preferred.

(1) Polyimide powder and aromatic polyamideimide powder are pre-mixed to prepare a uniform mixture of powder by using a blender such as a mortar, Henshel mixer, drum blender, tumbler blender, ball mill or ribbon blender.

(2) Polyimide powder is first dissolved or suspended in an organic solvent. Aromatic polyamideimide is added to the resulting solution or suspension and dispersed or dissolved uniformly, followed by removing the solvent to give a powdered mixture.

(3) Aromatic polyamideimide is suspended or dissolved in an organic solvent solution of polyamic acid which is the precursor of polyimide in this invention. The resultant suspension is imidized by heat treatment at 100°–400° C. or by chemical imidization with a conventional imidizing agent, followed by removing the solvent to give a powdered mixture.

The powdered resin composition of polyimide thus obtained can be used as is for various molding applications such as injection molding, compression molding, transfer molding and extrusion molding.

A more preferred method is fusion blending of the resins prior to molding. Fusion blending of polyimide and aromatic polyamideimide in the forms of, respectively, powder and powder, pellet and pellet, or powder and pellet is a simple and effective method.

Fusion blending can be carried out by using fusion blending equipment for usual rubber and plastics, for example, hot rolls, Banbury mixer, Brabender and extruder. The fusion temperature is set above the fusion temperature of the formulated system and below the initiation temperature of its decomposition. The temperature for blending polyimide with aromatic polyamideimide is normally in the range of 280°–420° C. and preferably in the range of 300°–400° C.

As to the method of molding the resin composition in this invention, injection and extrusion molding are suitable because these methods form an uniform blend of fused polymers and have a high productivity. Other processing methods such as transfer molding, compression molding and sinter molding may also be applied.

In addition, the resin composition of this invention may contain at least one solid lubricant such as molybdenum disulfide, graphite, boron nitride lead monoxide and lead powder. The composition may also contain at least one reinforcing material such as glass fibers, carbon fibers, aromatic polyamide fibers, potassium titanate fibers and glass beads.

The resin composition of this invention may contain at least one commonly used additive within the range which has no adverse effect on the object of this invention. Such additives include, for example, antioxidants, heat stabilizers, ultraviolet absorbers, flame retardants, auxiliary flame retardants, antistatic agents, lubricants and coloring agents.

EXAMPLES

The present invention will hereinafter be illustrated further in detail by way of synthesis examples, examples and comparative examples.

Synthesis Example 1

A reaction vessel equipped with a stirrer, reflux condenser and nitrogen inlet tube was charged with 5.92 kg (10 moles) of bis[4-(3-(4-aminophenoxy)benzoyl)-phenyl]ether and 18.8 kg of N,N-dimethylacetamide. To the mixture was added 2.14 kg (9.8 moles) of pyromellitic dianhydride by portions in a nitrogen atmosphere at room temperature and at a rate to avoid a large temperature rise of the solution and stirred for 24 hours at room temperature.

To the resultant polyamic acid solution, 5.37 kg of N,N-dimethylacetamide was added, and then 4.08 kg (40 moles) of triethylamine and 6.03 kg (60 moles) of acetic anhydride were added dropwise in a nitrogen atmosphere at room temperature and further stirred for 24 hours at room temperature. The reaction mixture was poured into 250 l of water well stirred. The separated product was filtered, washed with methanol and dried at 150° C. for 24 hours under reduced pressure to obtain 7.47 kg of pale yellow polyimide powder (about 97% yield). The inherent viscosity of polyimide powder was 0.86 dl/g. The inherent viscosity was measured at 35° C. after dissolving 0.5 g of the polyimide powder in 100 ml of a solvent (a mixture of p-chlorophenol and phenol in a ratio of 90:10 by weight) at elevated temperatures and cooling the resulting solution.

The polyimide powder had a glass transition temperature of 235° C. in accordance with the DSC method.

|  | Elementary anaylsis | | |
| --- | --- | --- | --- |
|  | C | H | N |
| Calculated (%) | 74.42 | 3.38 | 3.62 |
| Found (%) | 74.35 | 3.30 | 3.58 |

Synthesis Examples 2-5

The same procedures as Synthesis example 1 were carried out. However, raw materials were changed. The diamines and tetracarboxylic dianhydrides were varied to obtain various polyimide powders. Table 1 illustrates conditions for the synthesis of the polyimide resins, inherent viscosities and glass transition temperatures (Tg) thereof.

Synthesis Example 6

A reaction vessel equipped with a stirrer, reflux condenser and nitrogen inlet tube was charged with 61.67 kg (100 moles) of bis[4-(4-(4-aminophenoxy)phenoxy)phenyl]sulfone and 473.0 kg of N,N-dimethylacetamide. To the mixture was added 20.7 kg (95 moles) of pyromellitic dianhydride by portions in a nitrogen atmosphere at room temperature and at a rate to avoid a large temperature rise of the solution and stirred for 20 hours at room temperature.

The inherent viscosity of the polyamic acid thus obtained was 0.56 dl/g. The inherent viscosity of the polyamic acid was measured at 35° C. after dissolving 0.5 g of the polyamic acid in 100 ml of N,N-dimethylacetamide.

To the resultant polyamic acid solution, 275 kg of N,N-dimethylacetamide was added, and then 40.4 kg (400 moles) of triethylamine and 61.2 kg (600 moles) of acetic anhydride were added dropwise in a nitrogen atmosphere at room temperature and stirred for 24 hours at room temperature. The reaction mixture was poured into 2,500 l of water well stirred. The separated product was filtered, washed with methanol and dried at 180° C. for 5 hours under reduced pressure to obtain 77.2 kg Of polyimide powder (about 98% yield).

The polyimide powder had a glass transition temperature of 285° C. and melting point of 420° C. in accordance with the DSC method.

|  | Elementary analysis | | | |
| --- | --- | --- | --- | --- |
|  | C | H | N | S |
| Calculated (%) | 69.17 | 3.26 | 3.51 | 4.01 |
| Found (%) | 69.12 | 3.24 | 3.50 | 3.98 |

Synthesis Example 7-10

The same procedures as Synthesis example 6 were carried out, except various tetracarboxylic dianhydrides were used in place of pyromellitic dianhydride. The amounts of diamine and tetracarboxylic dianhydrides were varied to obtain various polyimide powders. Table 2 illustrates conditions for the synthesis of the polyimide resins, inherent viscosities of the polyamic acids and glass transition temperatures (Tg) of the polyimides.

Example 1-4

The polyimide powder obtained in Synthesis example 1 was dry blended with aromatic polyamide TORLON 4203L (a trademarked product of Amoco Chemicals Corp.) in various compositions as illustrated in Table 3. The mixture was kneaded by fusing at 340°-360° C, in a extruder and extruded to obtain uniform pellets. The

TABLE 2

| Synthesis example | Diamine | kg (mole) | Tetracarboxylic dianhydride | kg (mole) | Inherent Viscosity (dl/g) | Tg (°C.) |
| --- | --- | --- | --- | --- | --- | --- |
| 7 | Bis[4-(4-(4-aminophenoxy)phenoxy)phenyl] sulfone | 61.67 kg (100 moles) | 3,3',4,4'-Benzophenonetetracarboxylic dianhydride | 30.59 kg (95 moles) | 0.53 | 242 |
| 8 | Bis[4-(4-(4-aminophenoxy)phenoxy)phenyl] sulfone | 61.67 kg (100 moles) | Bis(3,4-dicarboxyphenyl) ether dianhydride | 29.45 kg (95 moles) | 0.54 | 235 |
| 9 | Bis[4-(4-(4-aminophenoxy)phenoxy)phenyl] sulfone | 61.67 kg (100 moles) | 3,3',4,4'-Biphenyltetracarboxylic dianhydride | 27.93 kg (95 moles) | 0.51 | 261 |
| 10 | Bis[4-(4-(4-aminophenoxy)phenoxy)phenyl] sulfone | 61.67 kg (100 moles) | 4,4'-(p-phenylenedioxy)-diphthalic dianhydride | 38.19 kg (95 moles) | 0.53 | 219 |

TABLE 1

| Synthesis example | Diamine | kg (mole) | Tetracarboxylic dianhydride | kg (mole) | Inherent Viscosity (dl/g) | Tg (°C.) |
| --- | --- | --- | --- | --- | --- | --- |
| 2 | Bis[4-(3-(4-aminophenoxy)benzoyl)phenyl] ether | 5.92 kg (10 moles) | 3,3',4,4'-Benzophenonetetracarboxylic dianhydride | 3.16 kg (9.85 moles) | 0.67 | 198 |
| 3 | Bis[4-(3-(4-aminophenoxy)benzoyl)phenyl] ether | 5.92 kg (10 moles) | 3,3',4,4'-Biphenyltetracarboxylic dianhydride | 2.90 kg (9.85 moles) | 0.69 | 197 |
| 4 | Bis[4-(3-(4-aminophenoxy)benzoyl)phenyl] ether Bis(4-aminophenyl) ether | 4.74 kg (8 moles) 0.40 kg (2 moles) | Pyromellitic dianhydride | 2.14 kg (9.8 moles) | 0.62 | 245 |
| 5 | Bis[4-(3-(4-aminophenoxy)benzoyl)phenyl] ether 4,4'-Bis(3-aminophenoxy)-biphenyl | 2.96 kg (5 moles) 1.84 kg (5 moles) | Bis(3,4-dicarboxyphenyl) ether dianhydride | 3.038 kg (9.8 moles) | 0.61 | 225 | pellets thus obtained was injection molded with an Arburg injection molding machine (Type: All-round A-220 from Arburg Co.) at an injection temperature of 380°–400° C. and a mold temperature of 280° C. The physical and thermal properties of the molded specimens were measured and the results are illustrated in Table 3. In Table 3, tensile strength and elongation at break, flexural strength and flexural modulus, Izod impact strength, and heat distortion temperature were measured in accordance with ASTM D-638, D-790, D-256 and D-648, respectively.

Besides Table 3 also illustrates minimum injection pressure which indicates melt flowability. Lower minimum injection pressure results from lower melt flowability.

Comparative Examples 1–2

The same procedures as Example 1-4 were carried out except that a composition outside the scope of this invention was used. The physical and thermal properties of molded specimens were measured and the results are illustrated in Table 3.

Examples 5–14 and Comparative Example 3–6

The procedure of Examples 1-4 were repeated by using the polyimide powder obtained in Synthesis examples 2-5 and aromatic polyamideimide powder TORLON 4203L to give uniformly blended pellets The pellets were injection molded. Physical and thermal properties were measured on the molded specimens.

Examples 15–17

The polyimide powder obtained in synthesis example 6 was dry blended with aromatic polyamideimide powder TORLON 4203L in various compositions as illustrated in Table 6. The mixture was kneaded by fusing at 380°–400° C. in a extruder and extruded to obtain uniform pellets. The pellets thus obtained was injection molded at an injection temperature of 380°–400° C. and a mold temperature of 220° C. The physical and thermal properties of the molded product were measured and the results are illustrated in Table 6.

Comparative Example 7–8

The same procedures as Examples 15–17 were carried out except that a composition outside the scope of this invention was used. The physical and thermal properties of molded specimens were measured and the results are illustrated in Table 6.

Examples 18–26 and Comparative Examples 9–12

The procedures of Examples 15–17 were repeated except that the polyimide powder obtained in Synthesis examples 7–10 and aromatic polyamideimide TORLON 4203L were used to give uniformly blended pellets. The pellets were injection molded. Physical and thermal properties were measured on the molded specimens. The results on example both within and outside the scope of this invention are illustrated in Table 7 as Examples 18–26 and Comparative examples 9–12, respec-

TABLE 3

| Example or Comparative example | Synthesis example | Polyimide (wt. parts) | Aromatic polyamide-imide TORLON 4203L (wt. parts) | Minimum injection pressure (kg/cm$^2$) | Tensile strength (kg/cm$^2$) | Elongation (%) | Flexural strength (kg/cm$^2$) | Flexural modulus (kg/cm$^2$) | Izod impact strength (notched) (kg cm/cm) | Heat distortion temperature (°C.) (18.6 kg/cm$^2$) |
|---|---|---|---|---|---|---|---|---|---|---|
| Ex. 1 | 1 | 95 | 5 | 500 | 1,050 | 94 | 1,500 | 29,000 | 8.8 | 206 |
| Ex. 2 | 1 | 85 | 15 | 510 | 1,190 | 83 | 1,600 | 32,700 | 9.7 | 216 |
| Ex. 3 | 1 | 75 | 25 | 520 | 1,340 | 70 | 1,700 | 36,000 | 11.0 | 228 |
| Ex. 4 | 1 | 50 | 50 | 535 | 1,550 | 57 | 1,800 | 38,500 | 12.0 | 239 |
| Comp. 1 | 1 | 100 | 0 | 500 | 1,005 | 100 | 1,450 | 28,000 | 8.4 | 200 |
| Comp. 2 | 1 | 0 | 100 | 610 | 1,920 | 13 | 2,150 | 47,000 | 14.0 | 275 |

The results on both within and outside the scope of this invention are illustrated in Table 4–5 as Examples 5–14 and Comparative examples 3–6, respectively.

tively.

TABLE 4

| Example or Comparative example | Synthesis example | Polyimide (wt. parts) | Aromatic polyamide-imide TORLON 4203L (wt. parts) | Minimum injection pressure (kg/cm$^2$) | Tensile strength (kg/cm$^2$) | Elongation (%) | Flexural strength (kg/cm$^2$) | Flexural modulus (kg/cm$^2$) | Izod impact strength (notched) (kg cm/cm) | Heat distortion temperature (°C.) (18.6 kg/cm$^2$) |
|---|---|---|---|---|---|---|---|---|---|---|
| Ex. 5 | 2 | 90 | 10 | 530 | 1,090 | 77 | 1,340 | 24,000 | 7.8 | 187 |
| Ex. 6 | 2 | 75 | 25 | 540 | 1,270 | 65 | 1,510 | 35,000 | 9.0 | 200 |
| Ex. 7 | 2 | 50 | 50 | 550 | 1,480 | 49 | 1,850 | 36,200 | 11.0 | 230 |
| Comp. 3 | 2 | 100 | 0 | 530 | 920 | 82 | 1,280 | 23,000 | 7.2 | 181 |
| Ex. 8 | 3 | 85 | 15 | 550 | 1,160 | 70 | 1,360 | 25,500 | 8.1 | 208 |
| Ex. 9 | 3 | 50 | 50 | 530 | 1,500 | 48 | 1,740 | 35,000 | 11.2 | 229 |
| Comp. 4 | 3 | 100 | 0 | 480 | 900 | 75 | 1,190 | 20,000 | 6.7 | 180 |

TABLE 5

| Example or Comparative example | Synthesis example | Polyimide (wt. parts) | Aromatic polyamide-imide TORLON 4203L (wt. parts) | Minimum injection pressure (kg/cm$^2$) | Tensile strength (kg/cm$^2$) | Elongation (%) | Flexural strength (kg/cm$^2$) | Flexural modulus (kg/cm$^2$) | Izod impact strength (notched) (kg cm/cm) | Heat distortion temperature (°C.) (18.6 kg/cm$^2$) |
|---|---|---|---|---|---|---|---|---|---|---|
| Ex. 10 | 4 | 90 | 10 | 550 | 1,100 | 87 | 1,520 | 31,400 | 8.3 | 234 |
| Ex. 11 | 4 | 75 | 25 | 555 | 1,260 | 67 | 1,680 | 35,200 | 9.2 | 242 |
| Ex. 12 | 4 | 50 | 50 | 565 | 1,500 | 53 | 1,850 | 39,500 | 11.1 | 253 |
| Comp. 5 | 4 | 100 | 0 | 550 | 980 | 90 | 1,400 | 29,100 | 7.5 | 227 |

TABLE 5-continued

| Example or Comparative example | Synthesis example | Polyimide (wt. parts) | Aromatic polyamide-imide TORLON 4203L (wt. parts) | Minimum injection pressure (kg/cm²) | Tensile strength (kg/cm²) | Elongation (%) | Flexural strength (kg/cm²) | Flexural modulus (kg/cm²) | Izod impact strength (notched) (kg cm/cm) | Heat distortion temperature (°C.) (18.6 kg/cm²) |
|---|---|---|---|---|---|---|---|---|---|---|
| Ex. 13 | 5 | 85 | 15 | 490 | 1,230 | 108 | 1,410 | 32,400 | 10.3 | 220 |
| Ex. 14 | 5 | 50 | 50 | 520 | 1,550 | 72 | 1,760 | 38,200 | 12.1 | 243 |
| Comp. 6 | 5 | 100 | 0 | 480 | 1,040 | 123 | 1,300 | 28,100 | 8.5 | 208 |

TABLE 6

| Example or Comparative example | Synthesis example | Polyimide (wt. parts) | Aromatic polyamide-imide TORLON 4203L (wt. parts) | Minimum injection pressure (kg/cm²) | Tensile strength (kg/cm²) | Elongation (%) | Flexural strength (kg/cm²) | Flexural modulus (kg/cm²) | Izod impact strength (notched) (kg cm/cm) | Heat distortion temperature (°C.) (18.6 kg/cm²) |
|---|---|---|---|---|---|---|---|---|---|---|
| Ex. 15 | 6 | 95 | 5 | 505 | 1,050 | 39 | 1,530 | 29,900 | 18.7 | 261 |
| Ex. 16 | 6 | 75 | 25 | 510 | 1,230 | 33 | 1,660 | 33,500 | 17.7 | 264 |
| Ex. 17 | 6 | 50 | 50 | 530 | 1,460 | 27 | 1,830 | 38,000 | 16.5 | 268 |
| Comp. 7 | 6 | 100 | 0 | 500 | 1,000 | 40 | 1,500 | 29,000 | 18.9 | 260 |
| Comp. 8 | 6 | 0 | 100 | 610 | 1,920 | 13 | 2,150 | 47,000 | 14.0 | 275 |

TABLE 7

| Example or Comparative example | Synthesis example | Polyimide (wt. parts) | Aromatic polyamide-imide TORLON 4203L (wt. parts) | Minimum injection pressure (kg/cm²) | Tensile strength (kg/cm²) | Elongation (%) | Flexural strength (kg/cm²) | Flexural modulus (kg/cm²) | Izod impact strength (notched) (kg cm/cm) | Heat distortion temperature (°C.) (18.6 kg/cm²) |
|---|---|---|---|---|---|---|---|---|---|---|
| Ex. 18 | 7 | 80 | 20 | 510 | 1,110 | 17 | 1,500 | 25,400 | 11.0 | 229 |
| Ex. 19 | 7 | 50 | 50 | 525 | 1,420 | 16 | 1,450 | 33,500 | 12.2 | 246 |
| Comp. 9 | 7 | 100 | 0 | 500 | 910 | 18 | 1,340 | 20,000 | 10.3 | 217 |
| Ex. 20 | 8 | 95 | 5 | 485 | 1,050 | 27 | 1,490 | 29,000 | 13.3 | 213 |
| Ex. 21 | 8 | 75 | 25 | 495 | 1,230 | 24 | 1,630 | 32,800 | 13.5 | 226 |
| Ex. 22 | 8 | 50 | 50 | 510 | 1,470 | 22 | 1,800 | 37,500 | 14.0 | 243 |
| Comp. 10 | 8 | 100 | 0 | 480 | 1,000 | 28 | 1,450 | 28,000 | 13.0 | 210 |
| Ex. 23 | 9 | 80 | 20 | 555 | 1,220 | 17 | 1,530 | 29,900 | 15.2 | 244 |
| Ex. 24 | 9 | 50 | 50 | 565 | 1,480 | 23 | 1,770 | 36,300 | 14.8 | 257 |
| Comp. 11 | 9 | 100 | 0 | 550 | 1,040 | 32 | 1,380 | 25,600 | 15.5 | 236 |
| Ex. 25 | 10 | 80 | 20 | 470 | 1,180 | 30 | 1,610 | 32,200 | 14.9 | 212 |
| Ex. 26 | 10 | 50 | 50 | 490 | 1,470 | 25 | 2,560 | 37,800 | 14.6 | 236 |
| Comp. 12 | 10 | 100 | 0 | 460 | 1,000 | 37 | 1,480 | 28,500 | 15.0 | 196 |

What is claimed is:

1. A polyamide resin composition comprising
(a) from 50.0% to 99.9% by weight of a polyimide having recurring units of the formula:

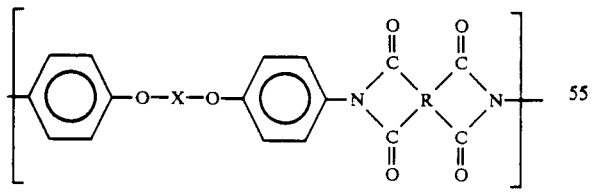

wherein X is a divalent radical selected from the group consisting of a radical of the formula:

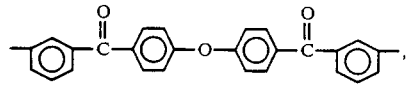

and a radical of the formula:

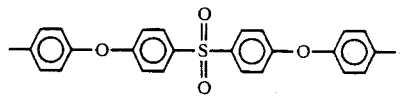

wherein R is a tetravalent radical selected from the group consisting of an aliphatic radical having 2 or more carbon atoms, an aliphatic radical, a monoaromatic radical, a fused polycyclic radical, and a polycyclic aromatic radical wherein aromatic radicals are linked to one another directly or via a bridge member, and (b) from 0.1% to 50.0% by weight of an aromatic polyamideimide substantially composed of recurring units of the formula:

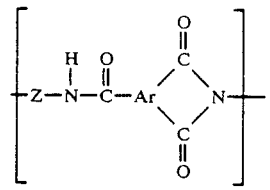

wherein Ar is a trivalent aromatic radical having one or more benzene rings, and Z is a divalent radical.

2. The polyamide resin composition as claimed in claim 1 wherein X is a divalent radical having the formula:

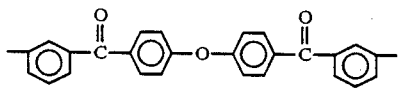

3. The polyimide resin composition as claimed in claim 1 wherein X is a divalent radical having the formula:

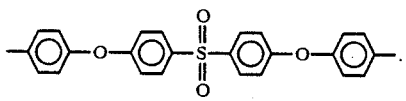

4. The polyimide resin composition as claimed in claim 1 wherein R is a tetravalent radical selected from the group consisting of

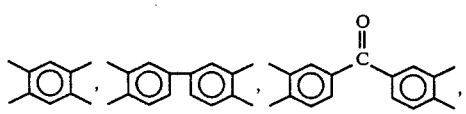

5. The polyimide resin composition as claimed in claim 2 wherein R is a tetravalent radical selected from the group consisting of

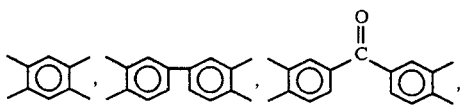

6. The polyimide resin composition as claimed in claim 3 wherein R is a tetravalent radical selected from the group consisting of

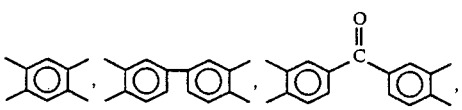

7. The polyimide resin composition as claimed in claim 1 wherein the aromatic polyamideimide has a recurring unit represented by the formula:

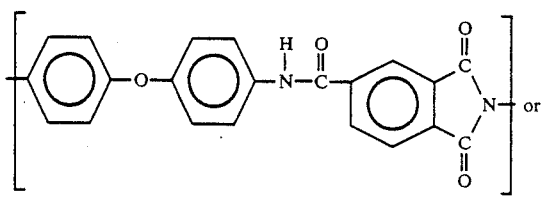

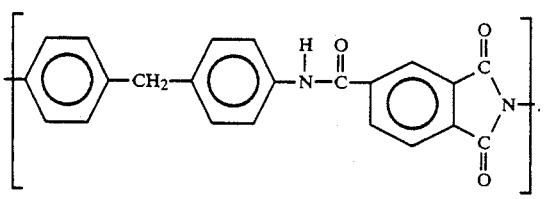

8. The polyimide resin composition as claimed in claim 2 wherein the aromatic polyamideimide has a recurring unit represented by the formula:

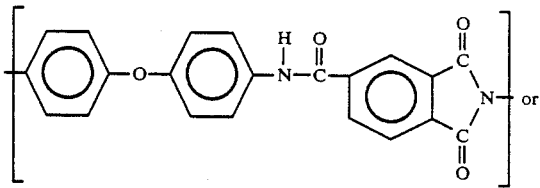

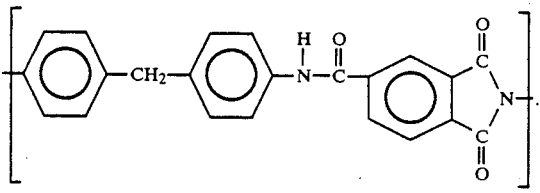

9. The polyamide resin composition as claimed in claim 3 wherein the aromatic polyamideimide has a recurring unit represented by the formula:

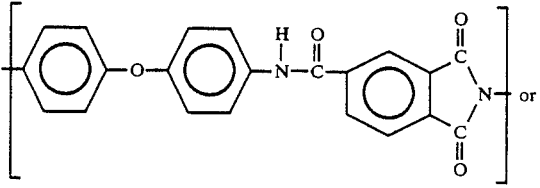

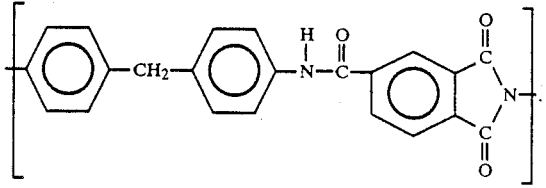

10. The polyimide resin composition as claimed in claim 4 wherein the aromatic polyamideimide has a recurring unit represented by the formula:

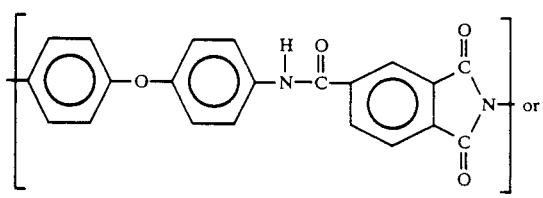
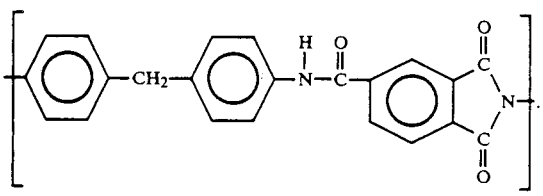
11. The polyamide resin composition as claimed in claim 5 wherein the aromatic polyamideimide has a recurring unit represented by the formula:
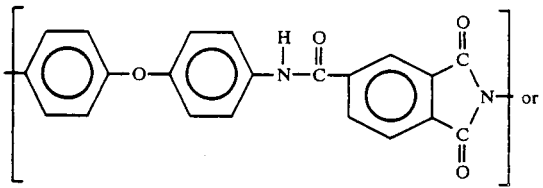
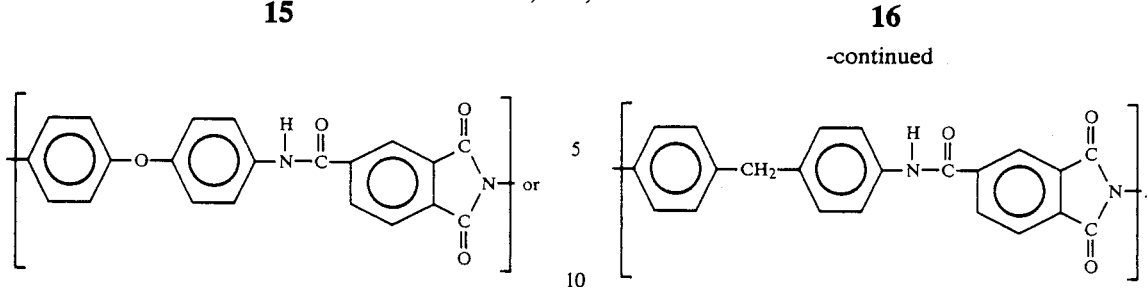
12. The polyimide resin composition as claimed in claim 6 wherein the aromatic polyamideimide has a recurring unit represented by the formula:
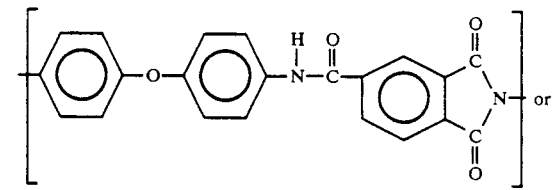
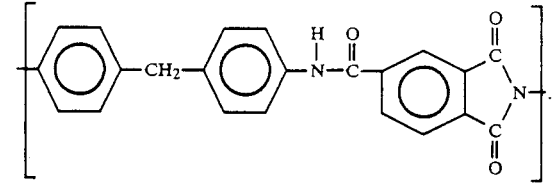
* * * * *

UNITED STATES PATENT AND TRADEMARK OFFICE
CERTIFICATE OF CORRECTION

PATENT NO. : 4,987,197

DATED : January 22, 1991

INVENTOR(S) : Masahiro OHTA ET AL.

It is certified that error appears in the above-identified patent and that said Letters Patent is hereby corrected as shown below:

Column 11, line 48: Delete "polyamide" and insert therefor --polyimide--;

Column 13, line 3: Before "radical" insert --organic--.

Column 14, line 43: Delete "polyamide" and insert therefor --polyimide--.

Column 15, line 21: Delete "polyamide" and insert therefor --polyimide--.

Signed and Sealed this

First Day of September, 1992

Attest:

DOUGLAS B. COMER

*Attesting Officer*    Acting Commissioner of Patents and Trademarks